Oct. 9, 1951     W. A. HYLAND     2,570,952

GRAIN DRILL LEVEL INDICATOR

Filed Dec. 19, 1945

INVENTOR.
WILLIAM A. HYLAND
BY
ATTORNEYS.

Patented Oct. 9, 1951

2,570,952

UNITED STATES PATENT OFFICE 2,570,952

GRAIN DRILL LEVEL INDICATOR

William A. Hyland, Horicon, Wis., assignor to John Deere Van Brunt Company, a corporation of Wisconsin Application December 19, 1945, Serial No. 635,932

2 Claims. (Cl. 116—114)

1

The present invention relates generally to agricultural implements and more particularly to planters and the like wherein a container is provided for feeding seed to the seed dispensing means of the implement.

The object and general nature of the present invention is the provision of a grain level indicator for the seed box of a grain drill or the like in which an arm member is pivotally connected to the end of the seed box with a level-following part on the inner end of the arm and responsive to the receding level of material in the seed box. More particularly, it is a feature of this invention to provide a simple and inexpensive device, and one of which the flotation part of the unit is made of sheet metal but with its walls so formed that it does not tend to settle down through the grain in operation but, instead, accurately follows the receding level of grain in the seed box.

Additionally, it is a feature of this invention to provide a grain level indicator that is mounted on the end of the seed box and with the indicating section of the unit disposed laterally outwardly of the end of the box.

These and other objects and advantages of the present invention will be apparent to those skilled in the art after a consideration of the following detailed description, taken in conjunction with the accompanying drawings, in which.

Figure 1:
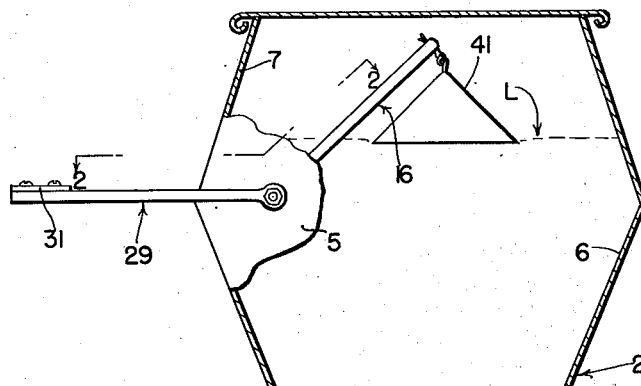
Figure 1 is an end view of a grain drill in which a quantity indicator incorporating the principles of the present invention has been provided.

Referring now to the drawings, more particularly Figure 1, the reference numeral 1 indicates a grain drill which includes a seed box 2 mounted by brackets 3 on the frame 4 of the grain drill. The near end of the grain box 2 is indicated by the reference numeral 5 and is fastened to the front and rear sides 6 and 7 of the grain drill in any suitable manner.

For indicating the level of seed in the seed box 2 I provide an arm member 15 pivotally mounted on the end 5 of the grain drill. The arm member 15 comprises an inner section 16 having an end 17 bent so as to extend outwardly through an opening 18 in the grain box end 5, preferably through a bearing member 19. The latter member is provided with a threaded shank 21 and a hexagonal head 22, and is firmly fixed to the

Figure 3:
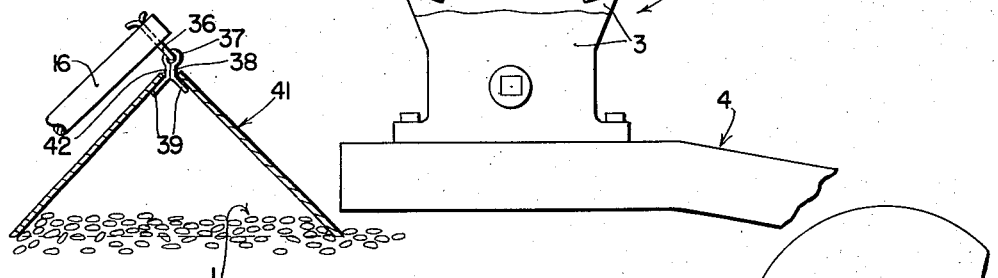
Figure 3 is an enlarged view of the level-responsive part of the indicator.

2 grain box end 5 by a nut 23 or other suitable means, the shank 21 and head 22 having a longitudinal opening 24 extending therethrough and through which the end 17 of the arm section 16 extends. The outer end of the portion 17 of the arm section 16 is threaded, as at 25, and receives a pair of lock nuts 26 between which the eye portion 28 of an outer arm section 29 is disposed and firmly fixed to the arm section 17. The outer end of the outer arm section 29 carries a plate 31 forming an indicator flag, which is adapted to be secured to the outer arm section 29 and by any suitable means, such as a pair of screws 32. Normally, the two arm sections 16 and 29 form a single member pivoted on the end of the grain box for generally free vertical swinging movement. The forward or inner end of the arm section 16 is apertured to receive a cotter 36, as best shown in Figure 3, and the eye of the cotter 36 receives the eye 37 of a second cotter 38, the ends 39 of which are disposed within a conical flotation member 41. This member has an opening 42 at its apex to receive the second cotter 38 and is disposed with its outer flaring end facing downwardly and with its apex facing upwardly, as shown in Figures 1 and 3.

Figure 2:
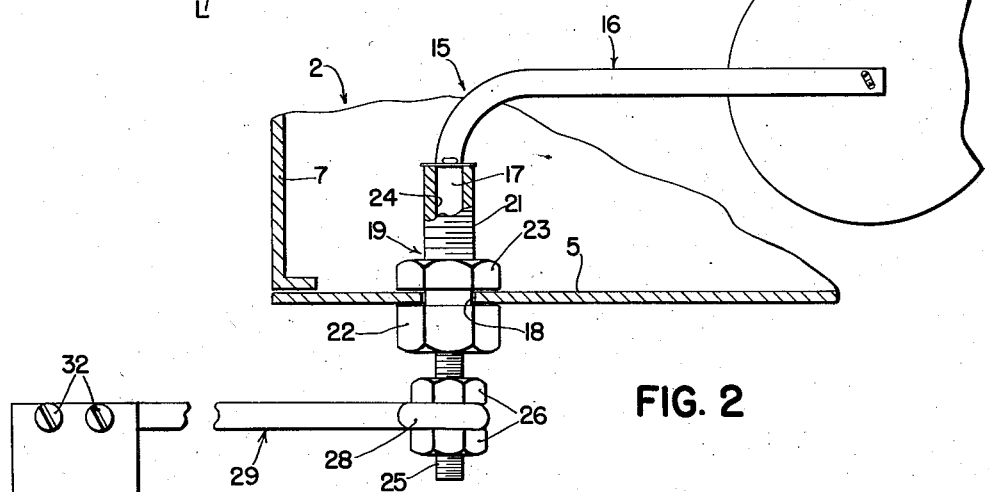
Figure 2 is a view taken generally along the line 2—2 of Figure 1.

In operation, the member 41, which preferably is formed of sheet metal or the like, follows the receding level L of grain in the seed box 2, and as the member 41 moves downwardly with the outward flow of grain from the box 2 the inner arm section 16 swings downwardly while the outer arm section 29, carrying the indicator flag 31, swings upwardly. As best shown in Figure 2, the flag 31 and arm 29 are disposed lateraly outwardly of the end 5 of the seed box 2.

The conical member 41, although preferably formed of sheet metal and per se appreciably heavier than the seed in the seed box, accurately follows the receding level of the grain in the box since, by virtue of the flaring outwardly and downwardly of the walls of the member 41 (as best shown in Figure 3), any tendency for the part 41 to settle down through the seed is resisted by those seeds that lie within the lower open end of the conical member 41 and would be crowded together and upwardly by said flaring walls by any downward movement of the member 41 through the grain. Therefore, although the member 41 is inherently of greater density than the seed, it remains on top of the seed in the grain box because of the resistance of the seeds within the open lower end of the member 41 to the inward and upward crowding and compacting thereof that would take place if the member 41 were forced downwardly through the seed.

The conical configuration of the member 41 also has a further advantage. After the seed in the seed box 2 has been planted and it is necessary to refill the seed box, the presence of the member 41 does not interfere with the refilling nor is it necessary for anyone to hold the member 41 in an upward position while refilling. After the grain box has been filled the member 41 will normally be at or near the bottom of the seed box. However, after the latter is filled the outer arm section 29 may readily be grasped and manipulated to swing the conical member 41 and the inner arm section 16 upwardly through the grain in the seed box. The movement of the member 41 upwardly through the grain is not materially resisted by virtue of the conical configuration of the upper side of the member 41.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A grain level indicator for the normally horizontal seed box of a grain drill or the like, said seed box having one or more generally vertical walls, said grain level indicator comprising an arm disposed in said seed box for rocking movement relative thereto about a generally longitudinal axis extending through a wall of said seed box, said arm having an indicating portion extending exteriorly of said box, a grain level responsive part comprising a hollow thin-walled structure shaped internally generally as a cone with its larger end disposed downwardly and open and its apical portion disposed upwardly, the wall portions of said conical structure converging upwardly, whereby any tendency for said part to settle downwardly through the grain substantially below the seed level therein is resisted by the grain within the lower open end of said part being crowded together and forced upwardly by the downwardly diverging wall portions at the lower end of said part a distance appreciably greater than the distance said conical structure moves downwardly, said part and indicating portion of said arm being relatively weighted so that the portion thereof within said box tends to rock downwardly about said axis with the receding seed level in said seed box, and means pivotally connecting the upper apical portion of said hollow conical part to the end of said arm within said seed box.

2. A grain level indicator for the normally horizontally disposed seed box of a grain drill or the like, said grain drill being adapted to be propelled across the field, as by a tractor or the like disposed ahead of the central portion of said seed box, with the latter extending transversely relative to the line of travel, said seed box having an upper side, an end and an upper rear edge adjacent said end, said grain level indicator comprising an arm disposed within said seed box, means at one end of said arm for pivotally mounting the latter on said one end of said seed box for swinging movement relative thereto in a generally vertical plane, a member carried at the other end of said arm and adapted to follow the receding level of grain therein, an indicator arm disposed outside said one end of said feed box, means connecting one end of said indicator arm with said first arm so as to move with the latter, said indicator arm being disposed in a generally vertical fore-and-aft extending plane lying outwardly of said one end of said seed box, and said first arm and said indicator arm being so angularly related that the other end of the latter arm is disposed below the upper side of and generally rearwardly of said seed box, except when the level of grain in the seed box becomes low, at which time said other end of the indicator arm moves upwardly above the upper rear edge of the seed box, whereby the outer end of the indicator arm becomes visible to an operator positioned generally ahead of the central portion of the grain drill, such as an operator on said tractor.

WILLIAM A. HYLAND.

REFERENCES CITED

The following references are of record in the file of this patent:

UNITED STATES PATENTS

| Number | Name | Date |
| --- | --- | --- |
| 1,024,850 | Hill | Apr. 30, 1912 |
| 1,237,735 | Wright | Aug. 21, 1917 |
| 1,391,504 | Renkin | Sept. 20, 1921 |
| 1,781,246 | Reynolds | Nov. 11, 1930 |